United States Patent
Hong et al.

(10) Patent No.: US 11,700,166 B2
(45) Date of Patent: *Jul. 11, 2023

(54) MAC-SYNC BASED MECHANISM FOR BRIDGE PORT FAILOVER

(71) Applicant: VMware, Inc., Palo Alto, CA (US)

(72) Inventors: Xinhua Hong, San Jose, CA (US); Dexiang Wang, Sunnyvale, CA (US); Sharath Bhat, Santa Clara, CA (US); Xinghua Hu, San Jose, CA (US); Jia Yu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,170

(22) Filed: Nov. 30, 2020

(65) Prior Publication Data

US 2021/0226839 A1    Jul. 22, 2021

Related U.S. Application Data (63) Continuation of application No. 16/212,379, filed on Dec. 6, 2018, now Pat. No. 10,855,519.

(51) Int. Cl.
*H04L 41/0668*    (2022.01)
*H04L 43/0817*    (2022.01)
(Continued)

(52) U.S. Cl.
CPC ...... *H04L 41/0668* (2013.01); *H04L 12/1868* (2013.01); *H04L 12/4679* (2013.01); *H04L 43/0817* (2013.01)

(58) Field of Classification Search
CPC ............ H04L 41/0668; H04L 12/1868; H04L 12/4679; H04L 43/0817
See application file for complete search history.

(56) References Cited

U.S. PATENT DOCUMENTS

| 9,602,305 B2 | 3/2017 | Sridhar et al. |
| 9,768,980 B2 | 9/2017 | Subramanivam et al. |
| 2018/0278577 A1 | 9/2018 | Chandrashekhar et al. |

*Primary Examiner* — Michael Thier
*Assistant Examiner* — Nevena Zecevic Sandhu
(74) *Attorney, Agent, or Firm* — Barta, Jones & Foley, PLLC (57) ABSTRACT

In an embodiment, a computer-implemented method for a MAC addresses synchronization mechanism for a bridge port failover is disclosed. In an embodiment, the method comprises: upon detecting a failover of a previously active bridge node, a standby bridge node performing: detecting a failover of a previously active bridge node; sending a request to one or more hosts to cause the one or more hosts to remove, from one or more corresponding forwarding tables, one or more MAC addresses, of one or more virtual machines, that the one or more hosts learned based on communications tunnels established with the previously active bridge node; for each MAC address stored in a MAC-SYNC table maintained by the standby bridge node: generating a first-type reverse address resolution protocol ("RARP") packet having a source MAC address retrieved from the MAC-SYNC table; broadcasting the first RARP message to a virtual extensible LAN ("VXLAN") switch via a bridge port of the VXLAN switch for the VXLAN switch to register the MAC address on the bridge port; storing an association of the MAC address and an identifier of the bridge port in a forwarding table maintained by the standby bridge node; for each MAC address that is stored in the forwarding table, but not in the MAC-SYNC table: generating a second-type RARP packet with such a MAC address to be the source MAC address; broadcasting the second RARP message from the VXLAN switch to a VLAN switch causing a physical switch to update a forwarding table maintained by the physical switch; and starting to forward traffic, via the bridge port, as an active bridge node.

20 Claims, 5 Drawing Sheets

(51) Int. Cl.
*H04L 12/18* (2006.01)
*H04L 12/46* (2006.01)

220 L2 Forwarding Table
M101→ VTEP Tunnel 217
M102→ VTEP Tunnel 217

220 L2 Forwarding Table
M101→ VTEP Tunnel 317
M102→ VTEP Tunnel 317

205B
MAC-SYNC Table
M101(MAC:Val)
M102(MAC:Val)

205B
MAC-SYNC Table
M101(MAC:Val)
M102(MAC:Val)

320B L2 Forwarding Table
M101→ VTEP Tunnel 117
M102→ VTEP Tunnel 117
M103→ VTEP Tunnel 317
M104→ VTEP Tunnel 317

320B L2 Forwarding Table
M101→ VP2
M102→ VP2
M103→ VTEP Tunnel 317
M104→ VTEP Tunnel 317

310A L2 Forwarding Table
M101→ VP1
M102→ VP1
M103→ VTEP Tunnel 217
M104→ VTEP Tunnel 217

310A L2 Forwarding Table
M101→ VTEP Tunnel 117
M102→ VTEP Tunnel 117
M103→ VTEP Tunnel 217
M104→ VTEP Tunnel 217

330A L2 Forwarding Table
M101→ P1
M102→ P2
M103→ P5
M104→ P5

330A L2 Forwarding Table
M101→ P1
M102→ P2
M103→ P6
M104→ P6

Bridge Node 110A is Active | Bridge Node 110B is Active →  Time

402 Send a FLUSH Message to all Transport Nodes (Hosts) to have the Hosts Clear their MAC Addresses Learned from VTEP Tunnels Established with a Previously Active Bridge Node

404 For each MAC Address in a MAC-SYNC Table, Create an RARP Packet with a Source MAC Address (Taken from the MAC-SYNC Table) to be that MAC Address, and Broadcast it to a VNI switch via the VNI switch port for the VNI switch to learn the MAC address on that port. This will cause: (1) updating the entries in a Forwarding Table of the Standby Bridge Node from (M101→ VTEP Tunnel 117) and (M102→ VTEP Tunnel 117) to the entries (M101 → VP2) and (M102 → VP2), respectively; and (2) updating the entries in a Forwarding Table of Host 105 from (M101→ VTEP Tunnel 217), (M102→ VTEP Tunnel 217) to (M101→ VTEP Tunnel 317), (M102→ VTEP Tunnel 317), respectively.

406 For Each MAC Address that is in the L2 Forwarding Table, but not in the MAC-SYNC Table, Create an RARP Packet with a Source MAC Address (from L2 Forwarding Table) to be that MAC Address, and Broadcast it from the VNI Switch Port to the VLAN Switch to cause the Physical Switch to Update the entries in its own L2 Forwarding Table from (M103→ P5) and (M104→ P5) to the entries (M103→ P6) and (M104→ P6), respectively.

FIG. 3

```
        0                1                 2                3
        0                5                                  1
410 ┌─────────┬───────────────────────┬──────────────────┐
412 │ Version │      Total Length     │     Command      │
    ├─────────┴───────────────────────┴──────────────────┤
    │                 MAC-SYNC content                   │
    └────────────────────────────────────────────────────┘
```

FIG. 4A

```
        0                1                 2                3
        0                5                                  1
414 ┌─────────────────────────────────────────────────────┐
416 │                    MAC Address                       │
418 ├───────────────────────────┬──────────────────────────┤
    │    MAC Address (cont.)    │     Bridge Port UUID     │
    ├───────────────────────────┼──────────────────────────┤
    │  Bridge Port UUID (cont.) │  Bridge Port UUID (cont.)│
    ├───────────────────────────┼──────────────────────────┤
    │  Bridge Port UUID (cont.) │  Bridge Port UUID (cont.)│
    ├───────────────────────────┼──────────────────────────┤
    │  Bridge Port UUID (cont.) │  Bridge Port UUID (cont.)│
    ├───────────────────────────┼──────────────────────────┤
    │  Bridge Port UUID (cont.) │           VNI            │
    ├───────────────────────────┴──────────────────────────┤
    │        VNI (cont.)                                   │
    └──────────────────────────────────────────────────────┘
```

FIG. 4B

```
        0                1                 2                3
        0                5                                  1
420 ┌──────────────────────────────────────────────────────┐
    │                  Bridge Port UUID                    │
    ├──────────────────────────────────────────────────────┤
    │               Bridge Port UUID (cont.)               │
    ├──────────────────────────────────────────────────────┤
    │               Bridge Port UUID (cont.)               │
    ├──────────────────────────────────────────────────────┤
    │               Bridge Port UUID (cont.)               │
    └──────────────────────────────────────────────────────┘
```

FIG. 4C

MAC-SYNC BASED MECHANISM FOR BRIDGE PORT FAILOVER

CROSS-REFERENCE TO RELATED APPLICATION

This application is a continuation of U.S. patent application Ser. No. 16/212,379, filed Dec. 6, 2018, entitled "A MAC-SYNC BASED MECHANISM FOR BRIDGE PORT FAILOVER", the entirety of which is hereby incorporated by reference herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Furthermore, it should not be assumed that any of the approaches described in this section are well-understood, routine, or conventional merely by virtue of their inclusion in this section.

Software defined networking ("SDN") manager is a network virtualization product that can be deployed in data centers to provision communications between virtual machines ("VMs") within the data centers and between VMs and external networks across the data centers. The SDN manager is usually configured to decouple the network functionalities into an underlay physical network layer functionality and an overlay logical network layer functionality. From the VMs' perspective, the VMs are connected through the overlay logical network.

A bridge node is a gateway component that cooperates with the SDN manager to support communications for VMs. The VMs implemented within the same logical L2 domain communicate with each other without crossing the boundaries of the overlay logical network and rely on the same overlay switch. Overlay switches are logical constructs that connect endpoints of an L2 overlay network. The functionality of an overlay switch may be distributed across hosts, each host having at least one endpoint, and a virtual switch and VTEP with flow tables and data tables defining the functionality of the overlay switch and establishing tunnel connections between the hosts through which the overlay network traffic communicated.

The bridge node also supports communications with machines that are connected to traditional virtual LANs ("VLANs") outside the overlay network structure. The VLAN networks may include logical segments of a physical network, or logical segments of multiple physical networks implemented by the virtual switches running on the plurality of hosts. The virtual switches are physical switches (in the sense that they establish connectivity across a physical network) but are "virtual" because they are implemented in software on each of the hosts. The bridge node provides bridging functionalities between the overlay switch and a virtual switch to which the machines are connected.

An SDN manager may support a high availability ("HA") configuration, which may be implemented using two bridge nodes: one acting as an active bridge node and another acting as a standby bridge node. The overlay switch, the virtual switch, and the bridge port connecting the switches usually have their entities instantiated on both the active and standby bridge nodes. However, only the bridge port on the active edge node is marked as active and forwards traffic between the overlay switch and the virtual switch. The bridge port on the standby bridge node is marked as inactive and it does not forward traffic.

Upon a failover between the active and standby bridge nodes, a bridge port on the standby bridge node will be activated and will start forwarding traffic, while a bridge port on the previously active bridge node will be marked as inactive and will stop forwarding traffic. Upon the failover, however, the overlay switch on the standby bridge node (that now needs to become active) lacks the information about the MAC addresses of, for example, physical machines that the previously active bridge node learned on its own bridge port. Without that information, the standby bridge node cannot notify other entities in the network that such MAC addresses are now reachable from the standby bridge node (now becoming active), and not from the previously active bridge node. Without receiving that information, the entities on the side of the VNI switch would still try to reach those MAC addresses through the previously active bridge node even though that bridge node is now inactive. This will cause the traffic to those MAC addresses to be black-holed. The traffic from the machines behind the bridge ports would also be black-holed because physical switches would continue forwarding the traffic to the previously active bridge node even though that bridge node is now inactive.

SUMMARY

In an embodiment, techniques are described for mechanisms for synchronizing MAC addresses information maintained by an active bridge node and a standby bridge node for handling a bridge port failover. The techniques provide a technical solution to the problem that arises upon a bridge port failover and when a standby bridge port needs to have information about the MAC addresses that an active bridge node has learned on its own a bridge port. The solution provides mechanisms that allow the standby bridge node to obtain such MAC addresses while the active bridge node is still active. Thus, upon a bridge port failover, the standby bridge port (now becoming active) and other entities can handle traffic to and from such MAC addresses correctly. In an embodiment, the solution is implemented in a MAC-SYNC protocol adapted by the active and standby bridge nodes.

The synchronization mechanisms allow synchronizing the MAC addresses information between an active bridge node and a standby bridge node. Thus, upon a bridge port failover from the active bridge node to the standby bridge node, the standby bridge node (now becoming active) has in its own table the MAC addresses that the previously active bridge node learned on its own bridge port. The MAC addresses may be used to obtain and store, in a forwarding table of the standby bridge node, the bridge port information of the bridge port that is now becoming active due to the failover. The updating may also include updating, in the forwarding table of the standby bridge node, the virtual tunnel information of the tunnels that are now becoming active.

The synchronization mechanisms also allow the standby bridge node (now becoming active) to notify other entities in the network about the MAC addresses that are now reachable from the standby bridge node, and not from the previously active bridge node. Upon receiving the notifications, the entities on the side of the VNI switch can update their own forwarding tables and use contents of the updated forwarding tables to forward traffic via the bridge port of the standby bridge node to prevent the traffic from being black-holed.

Furthermore, the synchronization mechanisms allow the standby bridge node (now becoming active) to notify physical switches in physical networks to update their own forwarding tables. Upon receiving the notifications, a physical switch can determine a port that the physical switch should now use to forward traffic from the machines connected to the physical switch so that the traffic is directed to the standby bridge node (now becoming active), and not to the previously active bridge node. This prevents the traffic from the machines behind the bridge ports from being black-holed.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1A:
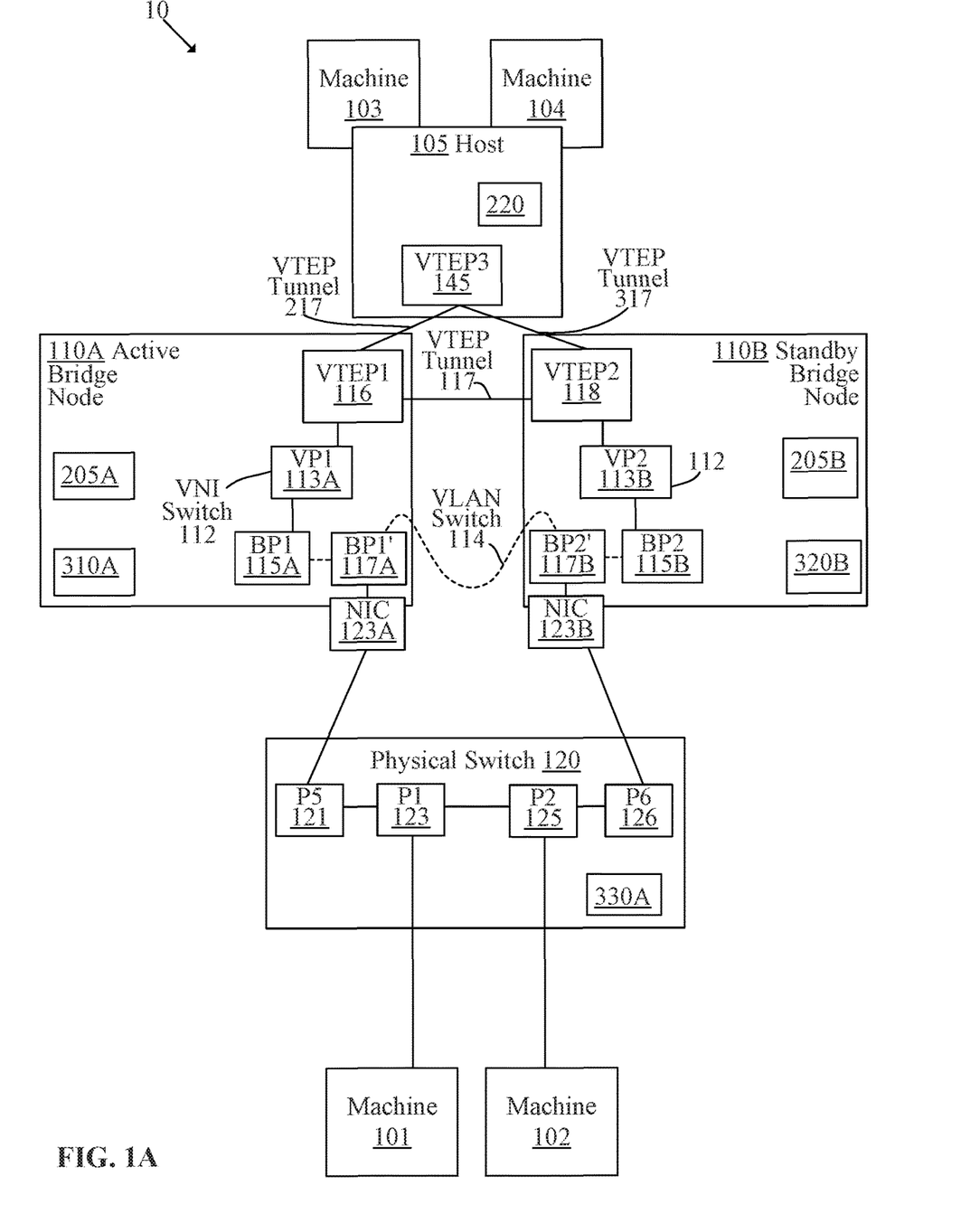
FIG. 1A-1B are block diagrams depicting an example physical implementation view of an example logical network environment for implementing a MAC addresses synchronization mechanism for a bridge port failover.

FIG. 1A is a block diagram depicting an example physical implementation view of an example logical network environment for implementing a MAC address synchronization mechanism for a bridge port failover. In the depicted example, environment 10 includes one or more hosts 105 (only one shown) an active bridge node 110A, a standby bridge node 110B, and a physical switch 120. Environment 10 may include additional elements, such as routers, switches, and gateways (not depicted in FIG. 1A).

Figure 1B:
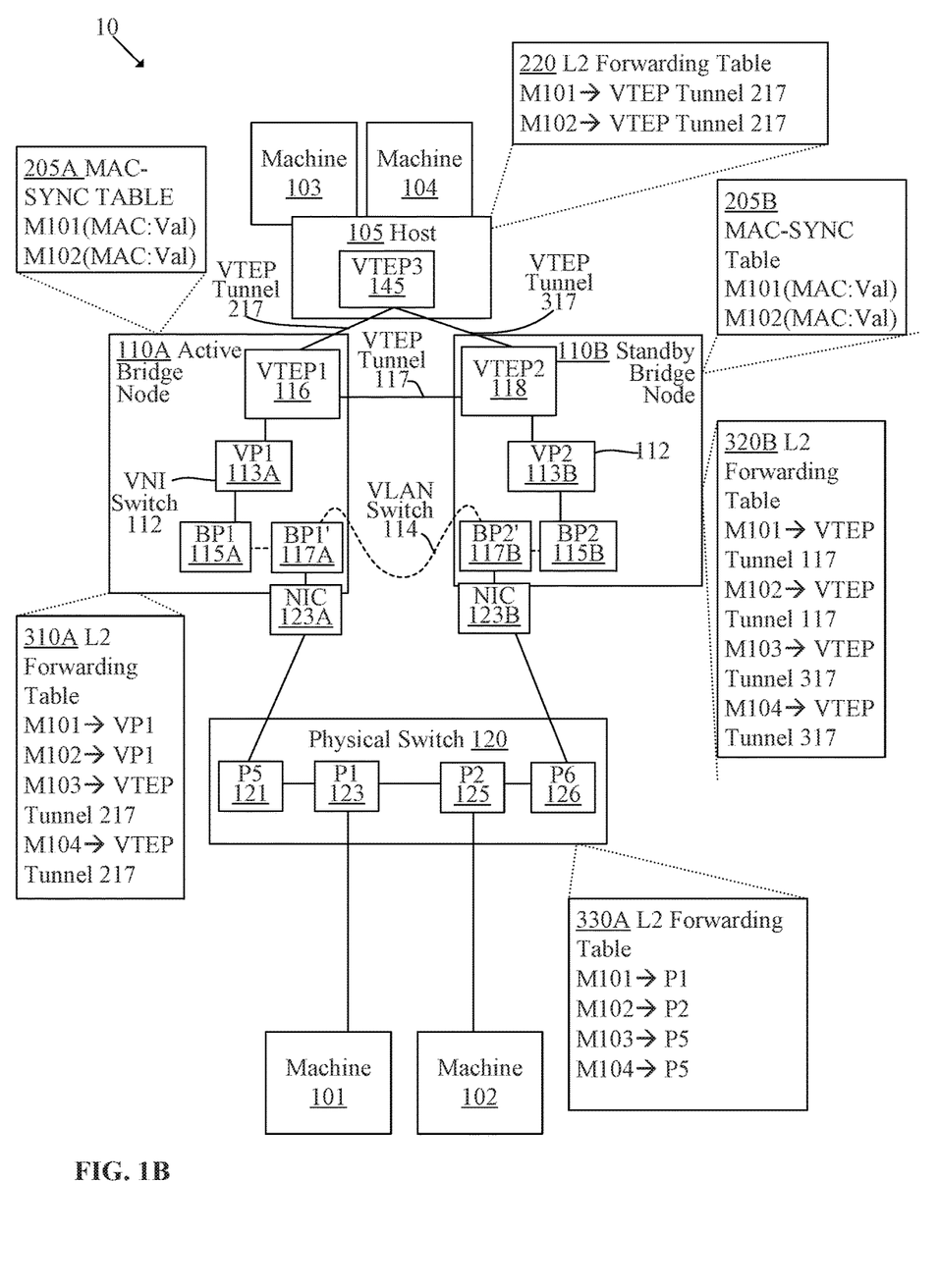

FIG. 1B shows contents of various tables to illustrate an example situation in which active bridge node 110A is in an active mode, and standby bridge node 110B is in a standby mode. In contrast, contents of various tables depicted in FIG. 2 (described later) illustrate an example situation in which active bridge node 110A became inactive, and standby bridge node 110B becomes active.

1.1. Physical Switch

Physical switch 120 is a hardware device used to connect devices such as physical machines 101-102. Physical switch 120 is configured to enable communications with the physical machines, and communications between the physical machines and virtual machines. Physical switch 120 usually includes a plurality of physical ports such as a port P1 123, a port P2 125, a port P5 121, and a port P6 126. Physical switch 120 guides the flow of network traffic to machines 101-102 by forwarding packets to physical machines 101-102 via ports P1-P2, respectively, and guides the traffic from machines 101-102 to a virtual network via ports P5-P6, respectively. It should be noted that in the embodiment described herein, physical switch 120 is a hardware switch device connected to physical machines 101, 102, which may be physical server devices. However, in alternate embodiments (not shown) physical switch 120 may be implemented in software as a virtual switch, and machines 101, 102 may be virtual machines connected to the virtual switch. For example, if physical switch 120 was implemented as a software switch, an uplink port would be provided that connects to a physical NIC connecting to the physical network and hence to NICs 123A, 123B. In this case, the virtual machines would connect to ports 123, 125 and would therefore still be directly attached to and reachable from the physical network just as are physical machines 101, 102. In either case, the bridge cluster described below would operate in an identical manner.

1.2. Example Host

Host 105 is a computer device configured to implement virtual machines, such as a VM 103 and a VM 104, edge service gateways, logical routers, logical switches, and the like (not shown). Host 105 is also referred to as a computing device, a host computer, a host device, a physical server, a server system, or a physical machine. VMs 103-104 are examples of virtualized computing instances or workloads. A virtualized computing instance may represent an addressable data compute node or an isolated user space instance.

In an embodiment, host 105 is configured to support execution of a hypervisor (not depicted in FIG. 1A-1B) and execution of managed forwarding elements (not depicted in FIG. 1A-1B). A hypervisor is a software layer or component that supports the execution of machines 103-104. The hypervisor may be configured to implement virtual switches and forwarding tables that facilitate traffic between the machines. In certain embodiments, the virtual switches and other components may reside in a privileged virtual machine, sometimes referred to as a "Domain Zero" or a "root partition" (not depicted in FIG. 1A-1B). The hypervisor may also maintain a mapping between underlying hardware components and virtual resources allocated to the respective VMs. The hardware components may include computer processors, memory units, physical network interface cards, and storage devices.

In an embodiment, host 105 supports one or more virtual tunnel endpoints ("VTEPs") 145. A VTEP is an endpoint that terminates a tunnel, such as a virtual extensible LAN ("VXLAN") tunnel. In the depicted example, VTEP tunnels that are terminated at VTEP3 145 include a VTEP tunnel 217, which is established between a VTEP1 116 on active bridge node 110A and a VTEP3 145 on host 105. VTEP3 145 also terminates a VTEP tunnel 317, which is established between a VTEP2 118 on standby bridge node 110B and a VTEP3 145.

VXLAN is an encapsulation protocol for implementing an overlay network over an existing L3 infrastructure. An overlay network is a virtual network that is built on top of existing L2 and L3 network technologies to support elastic compute architectures. VXLAN provides mechanisms for aggregating and tunneling multiple L2 network connections across the L3 infrastructure.

Each VXLAN network segment (also referred to as a "logical network" or an "overlay network") is associated with a unique 24-bit-long VXLAN network identifier ("VNI"), which is generically called a "virtual network identifier."

1.3. Example Forwarding Table Implemented in a Host

Host 105 may maintain a L2 forwarding table 220. Forwarding table 220 is a dynamic table that maps MAC addresses to ports or to VTEP tunnel identifiers. In the depicted example, forwarding table 220 includes an entry for a physical machine 101 and a physical machine 102. The entries indicate that VTEP tunnel 217 is used to forward traffic to machine 101 and to forward traffic to machine 102.

1.4. Example Bridge Cluster

Active bridge node 110A and standby bridge node 110B form a bridge cluster. A bridge cluster is a collection of transport nodes configured to connect virtual machines with machines accessible over the physical network, referred to herein as "virtual LAN ("VLAN")-backed machines" because they may be associated with a particular VLAN identifier. The machines are connected via a logical overlay network, referred herein as "VXLAN-backed machines." From the perspective of the bridge cluster, the overlay network would be logically isolated from the underlying physical network. Hence, the machines on the overlay network and underlying physical network can only communicate via the bridge cluster.

Only one of bridge nodes 110A-110B is active at a time. Having both active bridge node 110A and standby bridge node 110B in a bridge cluster provides resilience in the case of bridge node failure and helps to ensure that at least one bridge node is always operational. Active and standby bridge nodes 110A, 110B contain a plurality of virtual switches, each comprising a plurality of virtual ports. A virtual switch is a Layer 2 packet switch implemented in software. A virtual port is a software queue and servicing thread for receiving packets into the queue and forwarding packets from the queue in a first-in, first-out ("FIFO") manner. Packets are forwarded according to the forwarding table associated with the virtual switch. Ingress packets are received at one port of the virtual switch and forwarded to an egress port configured for that packet. Egress packets may be forwarded from the queue of the egress port to, for example, another virtual switch, a VTEP, or the physical NIC. The two virtual switches implemented on active and standby bridge nodes 110A, 110B are special because VNI switches 112 (one disposed on active bridge node 110A and another on standby bridge node 110B) are designated to only handle overlay network traffic. This distinguishes VNI switches 112 from virtual switches (not shown) on host 105, which handle traffic for logical overlay networks as well as physical underlay networks.

Although VNI switches 112 exclusively handle logical overlay network traffic, they are not "logical switches" because they do not define a logical network that spans multiple hosts. Furthermore, VNI switches 112 are not "distributed switches" in the sense that they cooperate with switches on other nodes to form a larger logical entity. Note that only one of bridge nodes 110A, 110B are active at a time. VLAN switches 114 (one disposed on active bridge node 110A and the other on standby bridge node 110B) are also special virtual switches, referred to as "bridges," because each of them has only two ports such that all the packets ingress into one of the VLAN switch ports egress out the other VLAN switch port.

U.S. Pat. No. 9,602,305, which is incorporated herein by reference in its entirety, describes a VXLAN gateway, which differs from a bridge described herein in that that gateways are Layer 3 devices (routers) that pass packets between different Layer 2 broadcast domains. In contrast, the bridge node described herein connects two Layer 2 broadcast domains into a single Layer 2 broadcast domain.

U.S. Pat. No. 9,768,980, which is also incorporated herein by reference in its entirety, describes a bridge that can connect a VXLAN based overlay network to another VXLAN based overlay network or to a physical network using components distributed across a plurality of hosts. The present bridge node is a distinct device for specific use cases where a resilient bridge between overlay and physical networks is important, but a highly scalable, highly distributed bridge is not needed.

As it will be described in detail later, when active bridge node 110A is in an active mode, traffic addressed to machines 101, 102 is received at VTEP 116, which decapsulates the inner packet. Note that since bridge node 110A forwards all traffic between network segments, the traffic will also include ARP requests and responses. Therefore, after sending the ARP request for a destination MAC address, machine 103, 104 can generate a packet having a destination MAC address of one of physical machines 101, 102 and a source MAC address of one of virtual machines 103, 104. This original packet is passed from VTEP 116 to VNI switch 112 which forwards the packet out according to its forwarding table as described in further detail below to port 113A. Port 113A is coupled to port 115A of VLAN switch 114. As mentioned above, VLAN switch 114 is a special virtual switch that has only two ports, one connected to VNI switch 112 and one connected directly to the physical network via NIC 123A. Any traffic received on one port comes out the other port; therefore, no forwarding table is needed for VLAN switch 114. Thus, traffic entering VLAN switch 114 at port 115A exits at port 117A, and then to NIC 123A. NIC 123A is connected to port 121 of physical switch 120, which forwards the packet to one of ports 123, 125 based on the destination MAC of the packet.

1.5. Example Forwarding Table Implemented in an Active Bridge Node

To forward traffic, VNI switch 112 of active bridge node 110A relies on a L2 forwarding table 310A, shown in FIG. 1B. L2 forwarding table 310A is a dynamic table that maps MAC addresses to ports or to VTEP tunnel identifiers. In the depicted example, forwarding table 310A includes an entry for physical machine 101, an entry for physical machine 102, an entry for VM 103, and an entry for VM 104. The entries indicate that VP1 113A is used to forward traffic to physical machines 101-102, and that VTEP tunnel 217 is used to forward traffic to VMs 103-104.

1.6. Example Forwarding Table Implemented in a Standby Bridge Node

When active bridge node 110A is active, standby bridge node 110B generally remains inactive. However, even when standby bridge node 110A is inactive, standby bridge node 110B maintains and uses a L2 forwarding table 320B to facilitate, for example, VXLAN traffic to and from VMs 103-104. L2 forwarding table 320B is a dynamic table that maps MAC addresses to ports or to VTEP tunnel identifiers. In the depicted example, forwarding table 320B includes an entry for physical machine 101, an entry for physical machine 102, an entry for VM 103, and an entry for VM 104. The entries indicate that VTEP 117 is used to forward traffic to physical machines 101-102, and that VTEP tunnel 317 is used to forward traffic to VMs 103-104.

1.7. Example MAC-SYNC Tables

If active bridge node 110A for some reason becomes inactive, then standby bridge node 110B needs to perform a bridge port failover and become active. Upon the bridge port failover, the previously active virtual port, such as VP1 113A, implemented in previously active bridge node 110A, becomes inactive, and VP2 113B becomes active and starts forwarding traffic toward VLAN-based machines. Furthermore, bridge ports BP1 115A and BP1' 117A become inactive, and BP2 115B and BP2' 117B become active. To perform the bridge port failover, however, standby bridge node 110B needs to have information about the MAC addresses that the previously active bridge node (i.e., node 110A) learned on its bridge ports 115A-117A. The solution to that problem is implemented using a MAC-SYNC protocol and MAC-SYNC tables 205A-205B.

In an embodiment, a MAC-SYNC protocol is adapted by both bridge nodes 110A-110B to allow standby bridge node 110B to collect, while active bridge node 110A is still active, information about MAC addresses learned by active bridge node 110A.

In an embodiment, a MAC-SYNC table is a hash table with a key and a value. The key may be a MAC address learned on a bridge port, while the value may be a bridge port unique user identifier ("UM") that may be allocated by, for example, an SDN manager, and a VNI of a VNI switch connected to a VLAN switch.

MAC-SYNC table 205B is a data structure that is maintained by standby bridge node 110B and is used to store information about MAC addresses that active bridge node 110A learned on bridge ports 115A-117A. The information about the MAC addresses is provided to MAC-SYNC table 205B when node 110A is still active, and by sending messages in compliance with the MAC-SYNC protocol which is implemented in both bridge nodes 110A-110B.

MAC-SYNC table 205A is a data structure that is maintained by active bridge node 110A and is used to store information about MAC addresses that active bridge node 110A learned on bridge ports 115A-117A. While active bridge node 110A is active, node 110A may send a MAC_SYNC UPDATE message to standby bridge node 110B to inform standby bridge node 110B of new MAC addresses that active bridge node 110A learned on BP1 115A. Active bridge node 110A may also send a MAC_SYNC DELETE message to inform standby bridge node 110B of MAC addresses that have been deleted from L2 forwarding table 310A of active bridge node 110A. Also, when active bridge node 110A is active, standby bridge node 110B may send a MAC_SYNC_REQUEST_FULL_SYNC message to active bridge node 110A to request a full synchronization of the MAC addresses between tables 205A-205B. Examples of the MAC-SYNC messages are described in detail in FIG. 4A-4C.

MAC-SYNC messages may be carried by specific Ethernet frames. A MAC-SYNC message Ethernet frame may have certain values included in a destination MAC address field, a source MAC address field, and in an Ethernet type field. The details are described in FIG. 4A-4C.

2. A MAC-SYNC Based Mechanism for Bridge Port Failover

FIG. 1B is a block diagram depicting an example physical implementation view of an example logical network environment for implementing a MAC addresses synchronization mechanism for a bridge port failover. The depicted example illustrates a situation in which active bridge node 110A became inactive, and thus standby bridge node 110B becomes active.

Upon the bridge port failover, a previously active virtual port, such as VP1 113A, implemented in previously active bridge node 110A, becomes inactive, and VP2 113B needs to become active for forwarding traffic toward VLAN-based machines. Furthermore, the bridge ports, such as BP1 115A and BP1' 117A become inactive, and BP2 115B and BP2' 117B need to become active. The detail steps of the bridge port failover process are described in FIG. 3.

Figure 2:
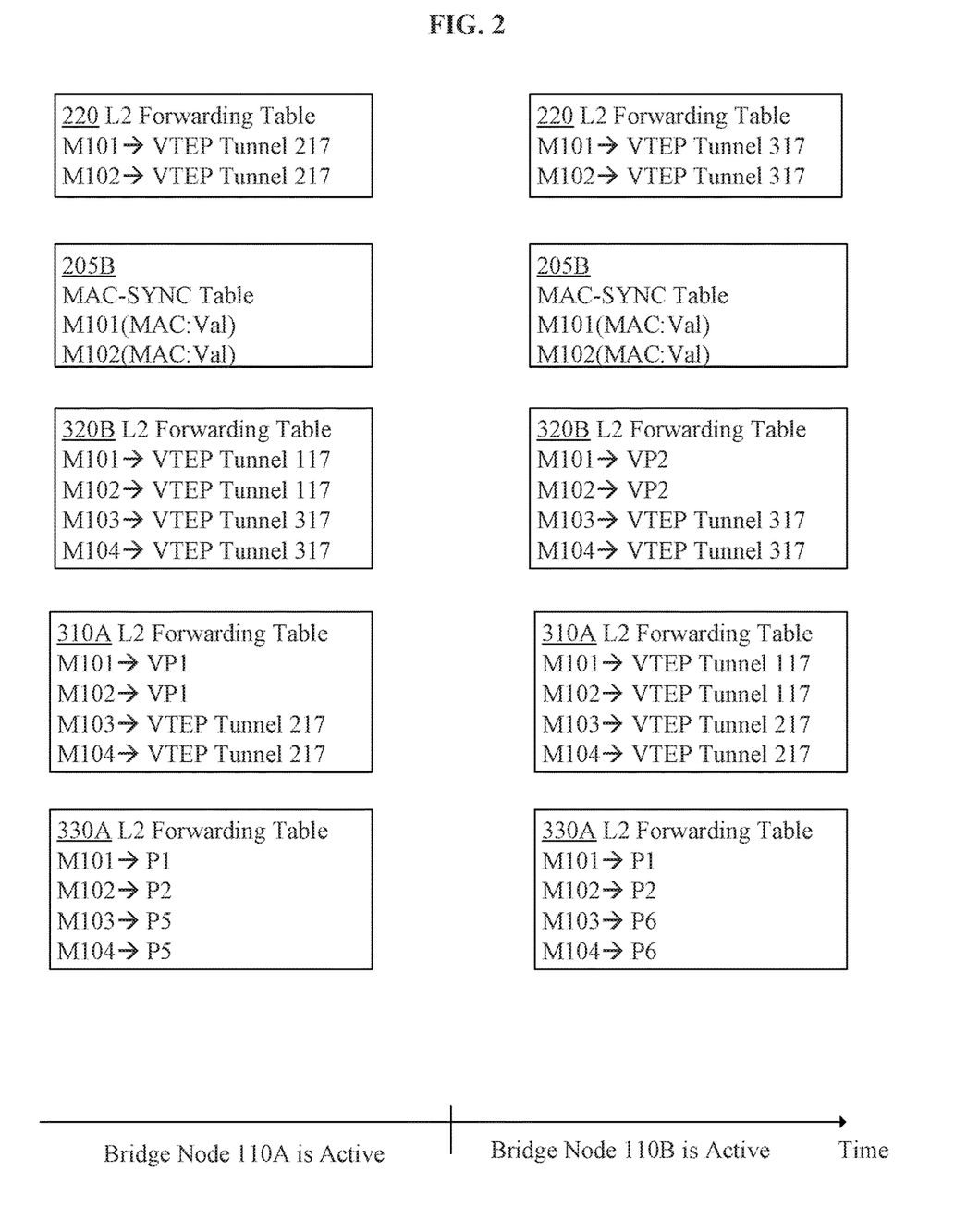
FIG. 2 is a block diagram depicting an example physical implementation view of an example logical network environment for implementing a MAC addresses synchronization mechanism for a bridge port failover.

In an embodiment, to perform a bridge port failover, standby bridge node 110B uses MAC-SYNC table 205B that contains information about MAC addresses that previously active bridge node 110A learned on its bridge ports 115A-117A. Based on the contents of MAC-SYNC table 205B, standby bridge node 110B generates certain requests and uses the responses to the requests to update its own L2 forwarding table 320B. The updated L2 forwarding table 320B is depicted in FIG. 2. The entries in the updated L2 table 320B indicate that VP2 113B is used to forward traffic to physical machines 101-102, and that VTEP tunnel 317 is used to forward traffic to VMs 103-104.

As the certain requests are disseminated throughout the network, host 105 updates its own L2 forwarding table 220. Updated L2 forwarding table 220 is depicted in FIG. 2. The entries in updated L2 table 220 indicate that VTEP tunnel 317 is used to forward traffic to physical machines 101-102.

As the certain requests are disseminated throughout the network, and previously active bridge node 110A reboots, node 110A updates its own L2 forwarding table 310A. Updated L2 forwarding table 310A is depicted in FIG. 2. The entries in updated L2 table 310A indicate that VTEP tunnel 117 is used to forward traffic to physical machines 101-102, and that VTEP tunnel 217 is used to forward traffic to VMs 103-104.

3. Example Flow Chart

Figure 3:
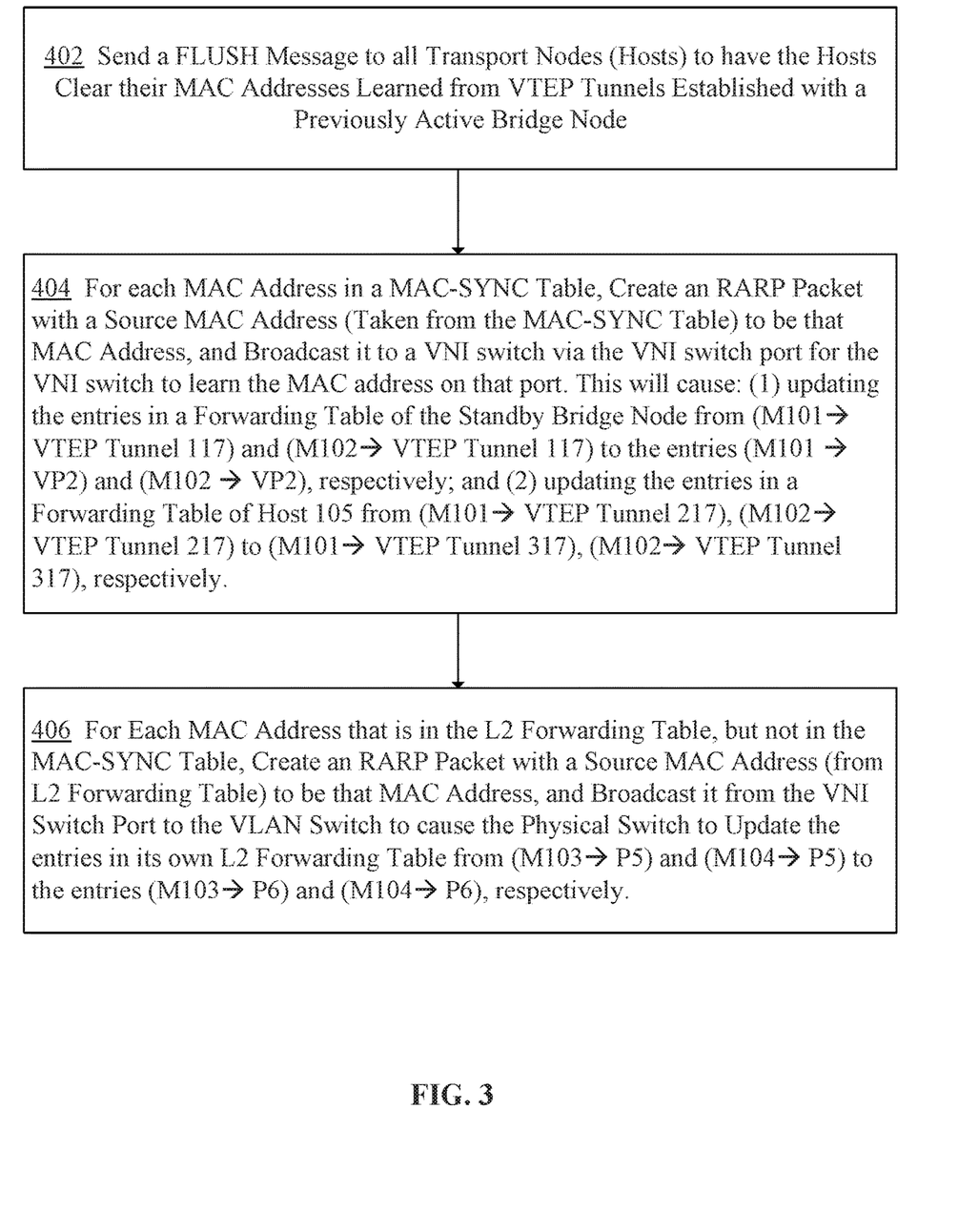
FIG. 3 is an example flow chart for implementing a MAC addresses synchronization mechanism for a bridge port failover.

FIG. 3 is an example flow chart for implementing a MAC addresses synchronization mechanism for a bridge port failover. The steps described in FIG. 3 may be performed by a standby bridge node when an active bridge node becomes inactive due to, for example, the node's failure or rebooting. The standby bridge node performs the steps described in FIG. 3 to enable the standby bridge node to assume an active role and become an active bridge node.

Upon a bridge edge failover, which may happen when an active bridge node crashes or reboots, a bridge port on a standby edge node becomes active. To enable traffic forwarding via the now-becoming-active bridge port, the information stored in forwarding tables needs to be updated to reflect the change in the topology of the network. This may involve updating a forwarding table maintained by the standby bridge node, updating forwarding tables maintained by hosts, and updating forwarding tables maintained by physical switches. The updates are necessary because when an active bridge node becomes inactive, the contents of some forwarding tables may become obsolete, and without updating the tables, the forwarded traffic may be blackholed.

In an embodiment, a forwarding table maintained by a VNI switch is updated with information about a bridge port that is a now becoming active on the standby bridge node, and with information about a VTEP tunnel that is now becoming active and terminated on the standby bridge node. To perform the updating, the standby bridge node uses the MAC addresses information stored in a MAC-SYNC table maintained by the standby bridge node.

In step 402, a standby bridge node sends a FLUSH message, or a similar message, to transport nodes, e.g., hosts, to have the hosts clear their MAC addresses learned from VTEP tunnels established with a previously active bridge node.

One of the purposes of sending the FLUSH message is to clear all the MAC addresses that the hosts learned from their VTEP tunnels and that the hosts used to forward the traffic to and from the machines hosted by the hosts when the previously active bridge node was active. The clearing of the MAC addresses pertains to removing the information from the L2 forwarding tables of the hosts that receive the FLUSH message. This also causes removing the MAC entries on a VNI switch to avoid forwarding the traffic destined to machines behind the inactive bridge port and thus, to avoid black-holing the traffic at the previously active bridge node.

In step 404, for each MAC address stored in a MAC-SYNC table maintained by the standby bridge node, the standby bridge node creates an RARP packet with a source MAC address (taken from the MAC-SYNC table) to be that MAC address in the RARP packet, and broadcasts the RARP packet to a VNI switch via a VNI switch port for the VNI switch to learn the MAC address on that port. The RARP is broadcast in nature since its DMAC is ff:ff:ff:ff:ff:ff. Since all the transport nodes (edge nodes and hypervisor nodes) within the span of the VNI switch need to update their local VNI switch's L2 forwarding tables to the new VTEP tunnel (to the new active edge node), the RARP packet will be replicated towards all those transport nodes via corresponding VTEP tunnels. Due to the L2 nature of RARP packet, it will be only forwarded within the VNI switch and it will not cross the L2 logical boundary. The tunnels to the transport nodes within the span of the VNI switch can be thought of as VNI switch ports as well, in addition to the local VNI switch ports connected to other logical entities like logical routers.

Generally, an RARP packet is used by a machine to request the machine's Internet Protocol address (e.g., an IPv4 address) from a computer network when the machine only knows its own Link Layer or hardware address, such as a MAC address. The machine broadcasts the request and does not need to know the network topology to receive a response to the request. The hosts that receive the RARP packet can respond to the RARP request as long as they maintain, in their mappings, the MAC address that was included in the request. More specifically, a host may respond to the RARP request if the host has a mapping between MAC addresses and, for example, IPv4 addresses, and has an entry in the mapping for the MAC address provided in the RARP packet.

However, in step 404, the RARP packet is sent not by a physical machine itself, but by the standby bridge node. It is the standby bridge node that sends the RARP packet with a source MAC address to be the MAC address of the physical machine on behalf of the physical machine. Hence, it is the standby bridge node that generates and broadcasts the RARP packet with the source MAC address to be the MAC address of the physical machine even though the physical machine itself is not actually sending any RARP packet.

Continuing with the example described in FIG. 2, sending the RARP packet may cause at least two things: updating the entries in L2 forwarding table 320B of standby bridge node 110B from (M101→VTEP Tunnel 117) and (M102→VTEP Tunnel 117) to the entries (M101→VP2) and (M102→VP2), respectively. Sending the RARP packet may also cause updating the entries in forwarding table 220 of host 105's VNI switch from (M101→VTEP Tunnel 217), (M102→VTEP Tunnel 217) to (M101→VTEP Tunnel 317), (M102→VTEP Tunnel 317), respectively.

In step 406, for each MAC address that is in the L2 forwarding table of the standby bridge node, but not in the MAC-SYNC table, the standby bridge node creates an RARP packet with a source MAC address (from the L2 forwarding table) to be that MAC address in the RARP packet and broadcasts the RARP packet from the VNI switch port to the VLAN switch.

In this step, the RARP packet is sent not by a machine itself, but by the standby bridge node on behalf of the machine. It is the standby bridge node that sends the RARP packet with a source MAC address to be the MAC address taken from the L2 forwarding table that is not in the MAC-SYNC table.

Continuing with the example described in FIG. 2, sending the RARP packet will cause physical switch 120 to update the entries in its own L2 forwarding table 330A from (M103→P5) and (M104→P5) to the entries (M103→P6) and (M104→P6), respectively.

Once step 408 is completed, the traffic in both directions between the VNI switch and the VLAN switch and through the now-active bridge port will be handled and forwarded properly.

4. Example Implementation of a MAC-SYNC Protocol

In an embodiment, a MAC-SYNC based mechanism for a bridge port failover is used to provide a standby bridge node with the MAC addresses that an active bridge node learned on its own bridge port. The MAC-SYNC mechanisms are implemented in a MAC-SYNC protocol that is adopted by both bridge nodes.

The MAC-SYNC protocol allows sending the information about the MAC addresses to the standby bridge node by the active bridge node that the active bridge node learned on its own bridge port. The protocol also allows sending the updates from the active bridge node to the standby bridge node about the MAC addresses that have been added to and/or the MAC addresses that have been deleted from the L2 forwarding table maintained by the active bridge node. The MAC-SYNC protocol also allows the standby bridge node to request a full synchronization of the MAC-SYNC table maintained by the standby bridge node with the up-to-date MAC-SYNC table maintained by the active bridge node.

In an embodiment, the MAC-SYNC protocol messages are carried by specific Ethernet frames in which the Ethernet headers have the following fields set to the following data: a destination MAC address set to 0xFFFFFFFFFFFF, a source MAC address set to 0xAABBCCDDEEFF, and a Ethertype field set to 0x88B5.

An Ethernet frame that carries a MAC-SYNC protocol message may be communicated within the VNI switch implemented between an active bridge node and a standby bridge node and via a VTEP tunnel that connects the two bridge nodes. Referring to FIG. 2, the MAC-SYNC protocol messages may be communicated view VTEP 117.

Figure 4A:
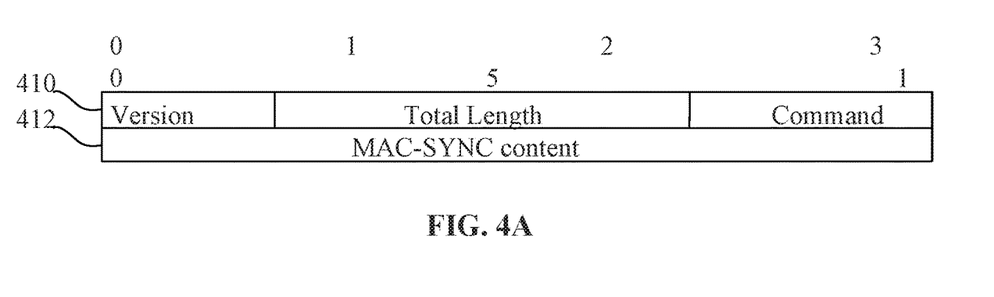
FIG. 4A depicts an example of a MAC-SYNC protocol frame.

FIG. 4A depicts an example of a MAC-SYNC protocol frame. In the depicted example, the MAC-SYNC protocol frame includes a header 410 and a content 412. Header 410 is referred to as a MAC-SYNC header 410. Content 412 is referred to as a MAC-SYNC content 412 and may be used to store any of the three types of MAC-SYNC messages described later.

In an embodiment, MAC-SYNC header 410 contains a MAC-SYNC protocol version field for storing a MAC-SYNC protocol version identifier, which may be any number from a set [1,127], and which is usually one-byte long. MAC-SYNC header 410 may also include a total length field for storing a total length of the MAC-SYNC protocol frame, including MAC-SYNC header 410 and MAC-SYNC content 412. MAC-SYNC content 412 may include any of three MAC-SYNC messages.

Sending a MAC-SYNC protocol message may allow the standby bridge node to synchronize its own MAC-SYNC table with the information about all MAC addresses that the active bridge node learned on a bridge port. The active and the standby bridge nodes maintain their own MAC-SYNC tables to store the information about those MAC addresses and use the information to smoothly perform a bridge port failover when the active bridge node becomes inactive.

In an embodiment, the MAC-SYNC protocol provides three types of messages: a MAC_SYNC UPDATE message, a MAC_SYNC DELETE message, and a MAC_SYNC_REQUEST_FULL_SYNC message.

A MAC_SYNC UPDATE message may be sent from the active bridge node to the standby bridge node and may be used to inform the standby bridge node when a new MAC address is learned by the active bridge node on a bridge port.

A MAC_SYNC DELETE message may be sent by the active bridge node to the standby bridge node and may be used to inform the standby bridge node that a particular MAC address learned by the active bridge node on a bridge port is being deleted from the L2 forwarding table on the active edge node, potentially due to expiration of the particular MAC address.

Figure 4B:
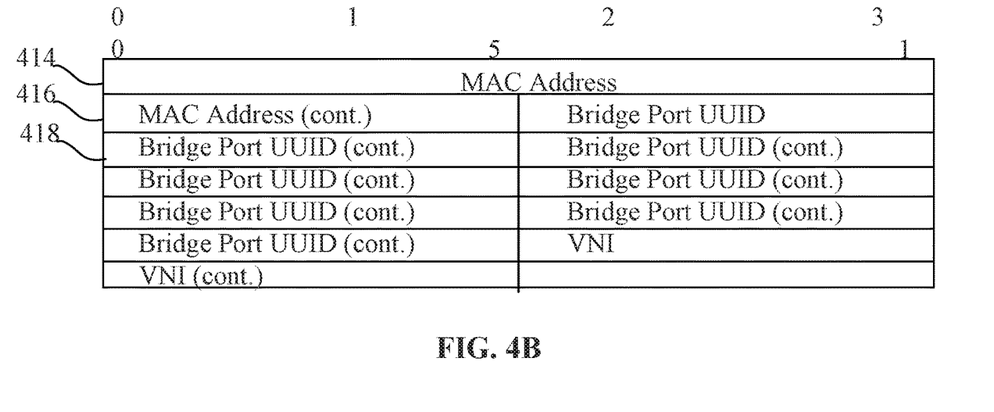
FIG. 4B depicts an example of a MAC_SYNC_UPDATE/DELETE message.

FIG. 4B depicts an example of a MAC_SYNC UPDATE/DELETE message. That message may be stored in MAC-SYNC content 412 and may include a MAC address field 414 for storing one or more MAC addresses for which the update or deletion is sent. Field 414 may include four bytes, and the list of the MAC addresses may additionally be included in two first bytes of a field 416. The remaining portion of field 416 and a several-byte-long field 418 may be used to store bridge port UUIDs and a VNI of a VNI switch to which the bridge port is connected.

A MAC_SYNC_REQUEST_FULL_SYNC message may be sent by the standby bridge node to the active bridge node and may be used by the standby bridge node to request a full synchronization of the MAC addresses learned by the active bridge node on a bridge port. The standby bridge node may send this message once the standby bridge node is rebooted and/or when for some reason the standby bridge node has lost the MAC address information previously obtained from the active bridge node.

Figure 4C:
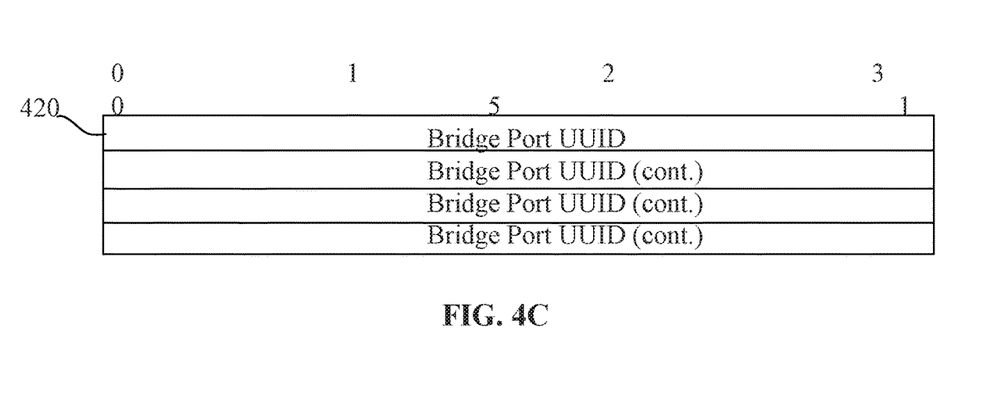
FIG. 4C depicts an example of a MAC_SYNC_REQUEST_FULL_SYNC message.

FIG. 4C depicts an example of a MAC_SYNC_REQUEST_FULL_SYNC message. That message may be stored in MAC-SYNC content 412 and may include one or more fields 420 for storing a bridge port UUID on which the MAC addresses were learned.

5. Improvements Provided by Certain Embodiments

In an embodiment, an approach presented herein provides mechanisms for performing a bridge port failover using the information communicated before the failover occurs by bridge nodes using a MAC-SYNC protocol. The mechanisms allow synchronizing MAC addresses information maintained by an active bridge node and a standby bridge node to enable the nodes to smoothly handle the bridge port failover when such occurs.

The described technical solution solves a problem that occurs upon a bridge port failover when a conventional standby bridge port does not have information about the MAC addresses that an active bridge node has learned on its own a bridge port.

6. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

7. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage, or attribute that is not expressly recited in a claim should limit the scope of the claim in any way. The specification and drawings are to be regarded in an illustrative rather than a restrictive sense.

What is claimed is:

1. A method for a standby bridge node to synchronize media access control (MAC) upon bridge-port failover, the method comprising:
   detecting a failover of a previously active bridge node;
   sending, in response to detecting the failover, a request to one or more hosts to cause the one or more hosts to remove, from one or more corresponding forwarding tables, one or more MAC addresses, of one or more virtual machines, that the one or more hosts learned based on communications tunnels established with the previously active bridge node;
   for each MAC address stored in a MAC-SYNC table maintained by the standby bridge node:
      generating a first-type reverse address resolution protocol ("RARP") packet having a source MAC address retrieved from the MAC-SYNC table;
      broadcasting the first-type RARP packet to a virtual extensible LAN ("VXLAN") switch via a bridge port of the VXLAN switch for the VXLAN switch to register the source MAC address on the bridge port;
      storing an association of the source MAC address and an identifier of the bridge port in a forwarding table maintained by the standby bridge node; and
   starting to forward traffic, via the bridge port, as an active bridge node.

2. The method of claim 1, wherein, upon a failover between the previously active bridge node and the standby bridge node, a bridge port implemented on the standby bridge node is activated and starts forwarding the traffic while a bridge port implemented on the previously active bridge node is marked as inactive and stops forwarding the traffic.

3. The method of claim 2, wherein the MAC-SYNC table maintained by the standby bridge node stores information about physical machines that are connected to a physical switch; and
wherein the information includes associations between MAC addresses of the physical machines, the identifier of the bridge port, and a VXLAN network identifier ("VNI").

4. The method of claim 3, wherein the MAC-SYNC table maintained by the standby bridge node is updated by the standby bridge node upon receiving an update from an active bridge node indicating that a new MAC address has been learned on a bridge port of the active bridge node;
wherein the MAC-SYNC table maintained by the standby bridge node is updated by the standby bridge node upon receiving an update from the active bridge node indicating that a particular MAC address has been deleted from a forwarding table implemented on the active bridge node; and
wherein the MAC-SYNC table maintained by the standby bridge node is updated by the standby bridge node upon receiving, in response to sending a request, an update from the active bridge node providing contents of the forwarding table implemented on the active bridge node.

5. The method of claim 1, wherein the VXLAN switch is a distributed logical VXLAN network identifier switch; wherein the VXLAN switch is instantiated on both the previously active bridge node and the standby bridge node; and
wherein the bridge port of the VXLAN switch bridges communications between a VXLAN network and a VLAN network.

6. The method of claim 1, wherein the VXLAN switch is a logical switch instantiated on both the previously active bridge node and the standby bridge node.

7. A method for a standby bridge node to synchronize media access control (MAC) upon bridge-port failover, the method comprising:
detecting a failover of a previously active bridge node;
sending, in response to detecting the failover, a request to one or more hosts to cause the one or more hosts to remove, from one or more corresponding forwarding tables, one or more MAC addresses, of one or more virtual machines, that the one or more hosts learned based on communications tunnels established with the previously active bridge node;
for each MAC address that is stored in a forwarding table, but not in a MAC-SYNC table:
generating a second-type reverse address resolution protocol (RARP) packet with such a MAC address to be a source MAC address;
broadcasting the second-type RARP packet from a virtual extensible LAN ("VXLAN") switch to a VLAN switch causing a physical switch to update a forwarding table maintained by the physical switch; and
starting to forward traffic, via a bridge port, as an active bridge node.

8. The method of claim 7, wherein, upon a failover between the previously active bridge node and the standby bridge node, a bridge port implemented on the standby bridge node is activated and starts forwarding the traffic while a bridge port implemented on the previously active bridge node is marked as inactive and stops forwarding the traffic.

9. The method of claim 8, wherein a MAC-SYNC table maintained by the standby bridge node stores information about physical machines that are connected to the physical switch; and
wherein the information includes associations between MAC addresses of the physical machines, an identifier of the bridge port, and a VXLAN network identifier ("VNI").

10. The method of claim 9, wherein the MAC-SYNC table maintained by the standby bridge node is updated by the standby bridge node upon receiving an update from an active bridge node indicating that a new MAC address has been learned on a bridge port of the active bridge node;
wherein the MAC-SYNC table maintained by the standby bridge node is updated by the standby bridge node upon receiving an update from the active bridge node indicating that a particular MAC address has been deleted from a forwarding table implemented on the active bridge node; and
wherein the MAC-SYNC table maintained by the standby bridge node is updated by the standby bridge node upon receiving, in response to sending a request, an update from the active bridge node providing contents of the forwarding table implemented on the active bridge node.

11. The method of claim 7, wherein, upon receiving the second-type RARP packet containing a particular MAC address of a particular physical machine, the physical switch:
determines a port identifier of a port that is implemented on the physical switch and that is configured to provide connectivity to the particular physical machine;
stores, in the forwarding table maintained by the physical switch, an association between the particular MAC address and the port identifier; and
enables communications with the particular physical machine via the port having the port identifier.

12. The method of claim 7, wherein the VXLAN switch is a distributed logical VXLAN network identifier switch;
wherein the VXLAN switch is instantiated on both the previously active bridge node and the standby bridge node; and
wherein a bridge port of the VXLAN switch bridges communications between a VXLAN network and a VLAN network.

13. The method of claim 7, wherein the VLAN switch is a logical switch instantiated on both the previously active bridge node and the standby bridge node.

14. A standby bridge node implemented in a virtual extensible LAN ("VXLAN") overlay computer network and configured to implement a media access control (MAC) address synchronization mechanism for a bridge port failover, the standby bridge node comprising:
one or more processors;
one or more memory units; and
one or more non-transitory computer-readable storage media storing one or more computer instructions which, when executed by the one or more processors, cause the one or more processors to perform:
detecting a failover of a previously active bridge node;

sending, in response to detecting the failover, a request to one or more hosts to cause the one or more hosts to remove, from one or more corresponding forwarding tables, one or more MAC addresses, of one or more virtual machines, that the one or more hosts learned based on communications tunnels established with the previously active bridge node;

for each MAC address stored in a MAC-SYNC table maintained by the standby bridge node:
  generating a first packet having a source MAC address retrieved from the MAC-SYNC table;
  broadcasting the first packet to a virtual extensible LAN ("VXLAN") switch via a bridge port of the VXLAN switch for the VXLAN switch to register the source MAC address on the bridge port;
  storing an association of the source MAC address and an identifier of the bridge port in a forwarding table maintained by the standby bridge node; or for each MAC address that is stored in the forwarding table, but not in the MAC-SYNC table:
  generating a second packet with such a MAC address to be the source MAC address;
  broadcasting the second packet from the VXLAN switch to a VLAN switch causing a physical switch to update a forwarding table maintained by the physical switch; and starting to forward traffic, via the bridge port, as an active bridge node.

15. The standby bridge node of claim 14, wherein, upon a failover between the previously active bridge node and the standby bridge node, a bridge port implemented on the standby bridge node is activated and starts forwarding the traffic while a bridge port implemented on the previously active bridge node is marked as inactive and stops forwarding the traffic.

16. The standby bridge node of claim 15, wherein the MAC-SYNC table maintained by the standby bridge node stores information about physical machines that are connected to the physical switch; and
wherein the information includes associations between MAC addresses of the physical machines, the identifier of the bridge port, and a VXLAN network identifier ("VNI").

17. The standby bridge node of claim 16, wherein the MAC-SYNC table maintained by the standby bridge node is updated by the standby bridge node upon receiving an update from an active bridge node indicating that a new MAC address has been learned on a bridge port of the active bridge node;
wherein the MAC-SYNC table maintained by the standby bridge node is updated by the standby bridge node upon receiving an update from the active bridge node indicating that a particular MAC address has been deleted from a forwarding table implemented on the active bridge node; and
wherein the MAC-SYNC table maintained by the standby bridge node is updated by the standby bridge node upon receiving, in response to sending a request, an update from the active bridge node providing contents of the forwarding table implemented on the active bridge node.

18. The standby bridge node of claim 14, wherein, upon receiving a second-type reverse address resolution protocol ("RARP") packet containing a particular MAC address of a particular physical machine, the physical switch:
  determines a port identifier of a port that is implemented on the physical switch and that is configured to provide connectivity to the particular physical machine;
  stores, in the forwarding table maintained by the physical switch, an association between the particular MAC address and the port identifier; and
  enables communications with the particular physical machine via the port having the port identifier.

19. The standby bridge node of claim 14, wherein the VLAN switch is a logical switch instantiated on both the previously active bridge node and the standby bridge node.

20. The standby bridge node of claim 14, wherein the first packet and the second packet are reverse address resolution protocol packets.

\* \* \* \* \*